United States Patent Office

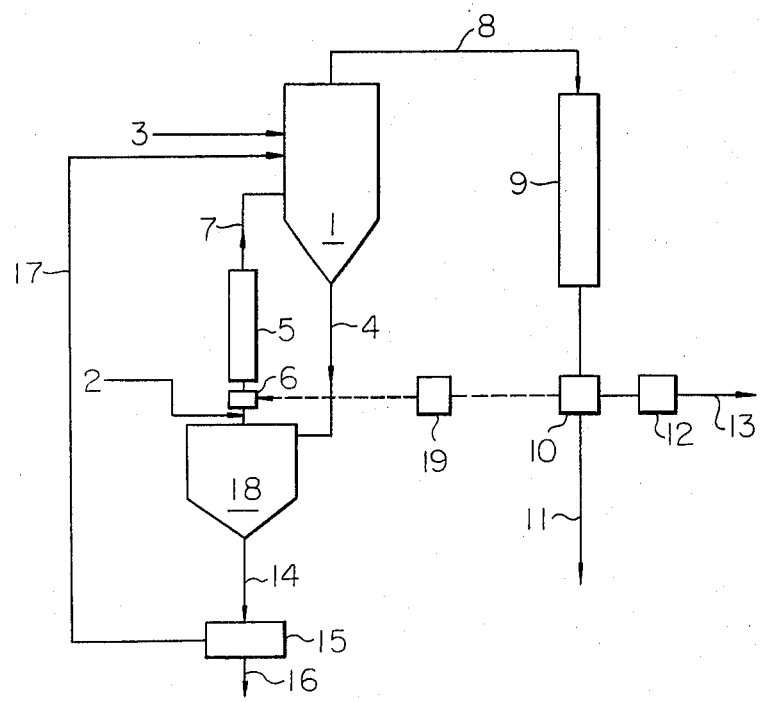

3,840,646
Patented Oct. 8, 1974

3,840,646
PROCESS FOR RECOVERING NITRIC ACID FROM WASTE PICKLE LIQUOR SOLUTION
Masakatsu Sugimoto, Teizo Senjo, and Chihiro Ozawa, Tokyo, and Athusi Sudo, Kawagoe, Japan, assignors to Fuji Kasui Engineering Co., Ltd., and Nippon Metal Industry Co., Ltd., both of Tokyo, Japan
Filed May 17, 1972, Ser. No. 254,237
Int. Cl. C01b 21/46
U.S. Cl. 423—390   3 Claims

ABSTRACT OF THE DISCLOSURE

An improved process for recovering a mixture of nitric acid and other acids such as hydrofluoric acid from a waste pickle liquor solution containing these acids and metal salts thereof is described, wherein the waste pickle liquor solution is diluted with sulfuric acid of an amount such that the concentration of nitric acid in the diluted solution is maintained below 0.2% by weight in the evaporation system and the diluted solution is evaporated, while being subjected to forced circulation through a circulation line on which a heating equipment made of impervious carbon or impervious graphite and a gas lift are provided.

---

This invention relates to a process for recovering nitric acid and other acids from a waste pickle liquor solution and, more particularly, to a process wherein the waste pickle liquor solution is, after being diluted with sulfuric acid, evaporated under reduced pressure to recover the nitric acid and the other acids. By the term "waste pickle liquor solution" treated in accordance with the present invention is meant a waste solution which results from the processing of metals such as, for example, stainless steel or other high alloy steel and titanium into flat-rolled and bar products involving the use of a pickling bath of a mixture of nitric acid and other acids such as hydrofluoric acid, and which contains nitric acid or an acid mixture and metal salts thereof dissolved therein.

Heretofore, in order to recover nitric and hydrofluoric acids from a waste solution resulting from pickling metals in a bath containing these acids, many processes have been proposed. For example, Dasher et al., U.S. Patent 2,993,757 discloses a noteworthy recovery system wherein the waste pickle liquor solution is concentrated in a first evaporator under vacuum conditions to drive off as much of the total liquid volume as possible and then, the distillate is passed to a second evaporator where sulfuric acid is added thereto to substitute the sulfate ion for the nitrate and fluoride ions and consequently boil off the nitric and hydrofluoric acids of a higher vapor pressure than sulfuric acid.

This recovery system, however, has the following defects: First, materials of construction offer a serious problem because the waste pickle liquor solution is one which can rapidly dissolve corrosion resistant metals. As a matter of fact, it is impossible to adopt a material of construction having both good resistivity to such a corrosive solution and good thermal conductivity. Therefore, the heating equipment and other evaporator accessory equipments have to be replaced at very frequent intervals. The recovery system, accordingly, involves the employment of coil heating equipment supplied with superheated steam, inside the evaporators. Such heating equipment is not conveniently replaceable. Secondly, since the recovery system includes two evaporators, it entails high costs of construction, operation and maintenance.

It is therefore a primary object of the present invention to provide an improved acid recovery process of the type such that sulfuric acid is added to a waste pickle liquor solution thereby to substitute the sulfate ion for both the nitrate ion and other acid radicals such as fluoride ions and form nitric acid or both nitric acid and other acids to be readily distilled off, as described above, which process causes little or no corrosion problem and accordingly ensures prolongation of the life span of the heating equipment and other evaporator accessory equipments.

Another object of the present invention is to provide an acid recovery system which includes only one evaporator and hence is far more advantageous in construction, operation and maintenance.

Other objects and advantages of the present invention will become apparent from the following description.

In accordance with the present invention, there is provided an improvement in the process of recovering a mixture of nitric acid and other acids such as hydrofluoric acid from a waste pickle liquor solution containing the acid mixture and metal salts thereof in solution wherein sulfuric acid is added to the waste pickle liquor solution and the resulting solution is boiled under reduced pressure to evaporate the acid mixture, an improvement characterized in that said waste pickle liquor solution is diluted with sulfuric acid of an amount such that the concentration of nitric acid in the diluted solution is maintained below 0.2% by weight, preferably below 0.15% by weight, in the evaporation system and the diluted solution is boiled, while being subjected to forced circulation through a circulation line in which at least one heating element made of impervious carbon or impervious graphite and at least one gas lift are fitted, to evaporate the nitric acid or the acid mixture.

It is contrary to expectations that the reduction of the concentration of nitric acid below 0.2% by weight in the mixed acid solution circulated in the entire evaporation system, by diluting the acid waste solution with sulfuric acid, would allow the employment of a heating equipment made of impervious carbon or impervious graphite both of which have a high thermal conductivity. In fact, in the case where impervious carbon or impervious graphite is employed in the known recovery system as disclosed in U.S. Pat. 2,993,757, these materials of construction are badly attacked and cannot be satisfactorily used.

The recovery system of the present invention will be illustrated in detail with reference to the accompanying drawing which is a flow sheet diagrammatically illustrating a preferable embodiment of the process of the present invention.

Referring to the drawing, an acid waste solution consisting essentially of a mixture of nitric and hydrofluoric acids and metal salts thereof is fed from a source 2 through a line 7 on which a gas lift 6 and a heating equipment 5 are arranged, into an evaporator 1. Concentrated sulfuric acid is fed from a source 3 into the evaporator 1 in the amount such that the concentration of nitric acid is reduced below 0.2% by weight, preferably below 0.15% by weight, based on the total weight of the diluted solution. In the evaporator, the metal salts of both nitric and hydrofluoric acids are converted into sulfates insoluble in the concentrated sulfuric acid while both the nitrate and fluoride ions react with hydrogen ions from the sulfuric acid to form both nitric and hydrofluoric acids. As shown in the drawing, the mixed acid solution of the acid waste and the sulfuric acid is subjected to forced circulation through a circulation path consisting of a line 4, a settling tank 18, a gas lift 6, a heating equipment 5 and a line 7, in order, whereby the mixed acid solution is uniformly heated at a predetermined temperature. When the evaporator 1 is operated under predetermined conditions, e.g. at a temperature of approximately 60 to 80° C. and a pressure of approximately 25 mm. Hg, the nitric and hydrofluoric acids having a higher vapor pressure than sulfuric acid are evaporated together with water. The vapor of nitric and hydrofluoric acids and water is withdrawn from the evaporator 1 through a line 8 and introduced into a surface condenser 9 supplied with cooling water where the vapor is cooled into a gas-liquid mixture, i.e. a liquid condensate consisting of nitric acid and hydrofluoric acid and gas consisting of non-condensable gas introduced from the gas lift 6 and a trace amount of nitric and hydrofluoric acids vapors. Then, the liquid condensate and the gas are separated from each other by a gas-liquid separator 10 arranged immediately downstream of the surface condenser 9. The liquid condensate is withdrawn through a line 11 and collected for reuse in pickling. The gas is washed with water by means of washer 12 and discharged through a line 13. The washing mitigates the problem of corrosion of the attached equipment arranged in the succeeding vacuum system.

A slurry in the evaporator 1 consisting of metal sulfates crystals such as ferric sulfate and the mixed acid solution of sulfuric acid and nitric and hydrofluoric acid is passed to a settling tank 18 such as a cone bottom gravity settler, for example, from which the metal sulfates sediment accompanied by the mixed acid solution is passed through a line 14 to a solid-liquid separator 15 such as, for example, a drum filter or any other filter. The solid portion, i.e. the metal sulfate is discharged through a line 16 and the liquid portion consisting of the mixed acid solution is recycled through a line 17 to the evaporator 1. Accordingly, the amount of fresh sulfuric acid to be fed from the source 3 is determined so as to correspond to that of sulfuric acid withdrawn from the recovery system as metal sulfates.

In a modified embodiment of the present invention, the non-condensable gas consisting mainly of air separated from the liquid condensate at the separator 10 is recycled to the gas lift 6 by means of a gas-transport device 19, as shown by a dotted line in the drawing. In this embodiment, introduction of fresh air through the gas lift 6 can be omitted and accordingly, the load on the vacuum pump (not shown in the drawing) is minimized to a great degree in comparison with the embodiment hereinbefore described, because the vacuum pump of this embodiment sucks only non-condensable gas accompanying the usual evaporation, such as air dissolved in the acid waste solution.

In another embodiment, the settling tank 18 and the solid-liquid separator 15 are arranged on a line (not shown), separated from the circulation path shown by the numerals 4, 6, 5 and 7.

The heating equipment 5 of the present invention is characterized by being made of impervious carbon or impervious graphite. By the term "impervious carbon or impervious graphite" is herein meant a carbon or graphite material having an extremely reduced porosity which is prepared, for example, by impregnating the material with a solution of resin resisting mineral and oxidizing acids, such as epoxy-phenolic resin and then curing the impregnated material, or by coating the material with such resins. These materials of construction are generally sold under the names of KARBATE by National Carbon Co., U. S. A. and TOKARBATE by Tokai Electrode Mfg. Co., Ltd., Japan. The heating equipment made of these materials of construction has the advantage of being able to resist the acid waste solution which has been diluted with sulfuric acid sufficient to reduce the concentration of nitric acid in the evaporator below 0.2% by weight.

The type of the heating equipment 5 is not critical. A heat exchanger of shell-and-tube type is preferred. In particular a one pass shell-an-tube type is most preferred because, in a multipass type heat exchanger, there is the fear of clogging of the slurry in the tube, although slight, and of an increased pressure drop.

The gas lift 6 used in the present invention has a construction such that compressed gas such as compressed air can be admitted into the vertical pipe, forming a mixture of liquid and gas within the pipe. The gas reduces the average density of the mixture to a value where the weight of the mixture is less than the pressure at the air inlet. Thus, the mixture of liquid and gas rises upward through the pipe at the proper rate, ensuring forced circulation of the heated acid mixed solution. The forced circulation prevents metal sulfate being deposited on the inner wall of the evaporator and achieves a rapid and uniform heating. The advantages of using a gas lift reside in the fact that, since a gas lift has no movable parts such as propellers, the material of construction is not easily eroded and hence, there is no need of frequent replacement of the gas lift and the maintenance cost is considerably reduced.

The inner walls of the evaporator 1 and the entire pipes including the gas lift 6 are lined with mineral and oxidizing acid-resisting resins such as, for example, polytetrafluoroethylene, polytrifluoromonochloroethylene, chlorinated polyether, polyvinyl chloride, etc.

In general, sulfuric acid which is used for the dilution of the waste pickel liquor solution has preferably the concentration of 60 to 98% by weight. When the concentration is lower than 60% by weight, the concentration of the nitric and hydrofluoric acids recovered becomes lower than that in the initial waste solution and hence, the recovered solution cannot be reused in pickling as it is.

The process of the present invention can be operated either in a batchwise or continuous manner.

The following Example illustrates the recovery of a mixture of nitric and hydrofluoric acids from a waste liquor solution resulting from pickling stainless steel in a bath containing nitric and hydrofluoric acids. In the Example, percent is percent by weight.

EXAMPLE

The recovery system shown in the accompanying drawing was employed. 100 kg. of 60% sulfuric acid was charged into an evaporator 1 maintained at a reduced pressure of 25 mm. Hg, and subjected to forced circulation through a line in which a heating equipment 5 supplied with steam at 1.5 kg./cm.$^2$ (abs) and a gas lift 6 were provided. The heating equipment 5 was a one-pass shell-an-tube type having a tube wall area of 2.5 m.$^2$, made of impervious carbon (TOKARBATE). The gas lift 6 had a tube diameter of 25 mm., through which air was fed at a rate of 0.15 kg./h. After the temperature of the circulated sulfuric acid reached approximately 70° C. at which the liquid boiled, whereby the water immediately evaporated, a mixed acid waste containing 14.5% nitric acid, 3.8% hydrofluoric acid and a total of 4.5% Fe, Ni and Cr ions was fed into the evaporator at a rate of 0.6 kg./min. with the temperature being maintained at 60–80° C. Vapor consisting substantially of the nitric acid, hydrofluoric acid and water vaporized, was condensed by a surface condenser 9, and separated by a gas-liquid separator 10. A condensate consisting of 17.1% nitric acid, 4.5% hydrofluoric acid, 0.1% sulfuric acid and 84.0% water was obtained at a rate of 0.49 kg./min. A non-condensate consisting of 75% air, 20.5% nitric acid, 2.7% hydrofluoric acid and 1.8% water was obtained at a rate of 0.002 kg./min.

From the bottom of a settling tank 18, a slurry of the residue mainly comprising ferric sulfate crystals was withdrawn at a rate of 0.38 kg./min. (calculated in terms of the ferric sulfate), while 98% sulfuric acid was fed to the evaporator 1 at a rate of 0.27 kg./min.

Steady state composition of the liquid circulated was as follows:

| | Percent |
|---|---|
| $H_2SO_4$ | 60–62.5 |
| $HNO_3$ | 0.15–0.07 |
| HF | 0.09–0.07 |
| A total of Fe, Ni, Cr | 2.0–0.6 |
| $H_2O$ the remainder | |

Even after the lapse of one year, both the heating equipment made of impervious carbon and the gas lift were still fit for use.

For testing the influence of mixed acid solutions on impervious carbon, the material of construction, the following laboratory corrosion test was carried out: Pipes having of 31.9 mm. outer diameter x 22.4 mm. inner diameter x 80 mm. length, made of the same material of construction as that of the above heating equipment were used as test pieces. After being cleaned with alcohol, dried at 110° C. and then weighed, the test pieces were separately immersed in the following mixed acid solution baths for one week at temperatures of 40 to 55° C.

Mixed acid solution A:

same composition as that of the liquid circulated as described above.

Mixed acid solution B,

| composition: | Percent |
|---|---|
| $H_2SO_4$ | 40–50 |
| $HNO_3$ | 0.5–2.0 |
| HF | 1.5–1.1 |
| A total of Fe, Ni, Cr | 5.1–3.2 |
| $H_2O$ the remainder. | |

After completion of the test period, the test pieces were cleaned with alcohol, dried at 110° C. and then weighed. Losses in weight (in grams) of the test pieces during the immersion in the solutions A and B, per area of the test pieces (in m.$^2$) and per hour were 0.000 g./m.$^2$·H and 0.015 g./m.$^2$·H, respectively.

What we claim is:

1. In the process of recovering an acid mixture containing nitric acid and hydrofluoric acid from a waste pickle liquor solution containing the acid and metal salts thereof dissolved therein, wherein sulfuric acid is added to the waste pickle liquor solution and the resulting solution is boiled under reduced pressure to evaporate the acid mixture, the improvement wherein said waste pickle liquor solution is diluted with sulfuric acid in an amount to reduce the concentration of nitric acid in the diluted solution below 0.2% by weight in the evaporation system and the so-diluted solution is boiled under reduced pressure to evaporate the acid mixture while said waste pickle liquor solution, diluted with sulfuric acid, is subjected to forced circulation between an evaporator and circulation piping fitted to the evaporator, the circulation having at least one heating element made of impervious carbon or impervious graphite and at least one gas lift is provided into which is introduced fresh air or a non-condensable gas, separated from the vapor boiled off during evaporation.

2. A process according to claim 1 wherein said added sulfuric acid has a concentration of 60 to 98% by weight.

3. A process according to claim 1 wherein said non-condensable gas separated from the vapor boiled off from the evaporator is washed with water and then discharged.

References Cited

UNITED STATES PATENTS

| 1,197,167 | 9/1916 | Zeisberg | 423—390 |
| 1,755,768 | 4/1930 | Busching | 423—390 X |
| 1,832,853 | 11/1931 | Bennett | 423—390 X |
| 1,922,289 | 8/1933 | Handforth | 203—13 |
| 2,993,757 | 7/1961 | Dasher et al. | 423—484 |

GEORGE O. PETERS, Primary Examiner

U.S. Cl. X.R.

134—13; 203—13